US007017066B2

(12) United States Patent
Retter et al.

(10) Patent No.: US 7,017,066 B2
(45) Date of Patent: Mar. 21, 2006

(54) METHOD, SYSTEM AND SYNCHRONIZATION CIRCUIT FOR PROVIDING HARDWARE COMPONENT ACCESS TO A SET OF DATA VALUES WITHOUT RESTRICTION

(75) Inventors: Eric E. Retter, Austin, TX (US); John M. Sutton, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 10/411,864

(22) Filed: Apr. 10, 2003

(65) Prior Publication Data

US 2004/0205369 A1 Oct. 14, 2004

(51) Int. Cl.
*G06F 1/12* (2006.01)
*G06F 1/14* (2006.01)
*G06F 1/04* (2006.01)
*G04C 11/00* (2006.01)
*G04C 19/00* (2006.01)
*G04C 19/02* (2006.01)

(52) U.S. Cl. ............... 713/400; 713/500; 713/501; 713/502; 368/47; 368/82

(58) Field of Classification Search ............... None
See application file for complete search history.

(56) References Cited

U.S. PATENT DOCUMENTS 6,055,285 A * 4/2000 Alston ................. 375/372
6,087,867 A * 7/2000 Holm .................. 327/144
6,760,798 B1 * 7/2004 Aldworth ............. 713/401
2002/0078420 A1 * 6/2002 Roth et al. ........... 714/798
2002/0116658 A1 8/2002 Yano
2003/0123588 A1 * 7/2003 Parikh ................. 375/354

FOREIGN PATENT DOCUMENTS

| EP | 0 684 539 B1 | 6/1995 |
| JP | 02-228759 | 9/1990 |
| JP | 2000-115147 | 4/2000 |
| WO | WO 98/13768 | 4/1998 |
| WO | WO 02/054205 A1 | 7/2002 |
| WO | WO 02/056176 A1 | 7/2002 |

* cited by examiner

*Primary Examiner*—Lynne H. Browne
*Assistant Examiner*—James K. Trujillo
(74) *Attorney, Agent, or Firm*—William H. Steinberg; Hoffman, Warnick and D'Alessandro LLC

(57) ABSTRACT

The present invention provides hardware-based synchronization within a device such as a set top box so that sets of data values can be communicated between a set of DCR registers operating at a first frequency and a set of clock register operating at a second frequency. Specifically, to communicate an initial set of data values from the set of DCR registers to the set of clock registers, a control signal is stretched and then synchronized with a clock signal having the second frequency. To communicate a current set of data values from the set of clock registers to the set of DCR registers, the control signal is synchronized with a clock signal having the first frequency. By communicating the current set of data values to the first set of registers, a hardware component (e.g., a CPU) can access the current set of data values without restriction.

20 Claims, 4 Drawing Sheets

METHOD, SYSTEM AND SYNCHRONIZATION CIRCUIT FOR PROVIDING HARDWARE COMPONENT ACCESS TO A SET OF DATA VALUES WITHOUT RESTRICTION

BACKGROUND OF THE INVENTION

1. Field of the Invention

The present invention generally relates to a method, system and synchronization circuit for providing hardware component access to a set of data value without restriction. Specifically, the present invention provides hardware-based synchronization within a set top box so that data values can be communicated between a set of clock registers operating at a first frequency and a set of DCR registers operating at a second frequency.

2. Background Art

Set top boxes are becoming increasingly popular in many households. Specifically, set top boxes are commonly used to receive cable and/or satellite television signals. As their popularity continues to grow, the functionality provided by the set top boxes improves. For example, many of today's set top boxes not only display date and time information, but also provide users with viewing schedules, pay per view options, etc. at the press of a button. In many cases, a set top box is designed to include circuitry that operates at more than one frequency. For example, a set top box can include real time clock circuitry and a set of clock registers that operates at one frequency, and a device control registry (DCR) interface that operates at another frequency. This can be problematic when access to data values stored in the set of clock registers is desired by a hardware component (e.g., a CPU). Specifically, the real time clock is generally updated once per second. During the update time, the clock registers are not accessible to hardware components. Thus, some type of restriction is required that provides hardware components with the opportunity to read in the data values from the set of clock registers. In general, these restrictions require software-based synchronization within the set top box. For example, one common form of restriction is an "interrupt" that prevents the clock registers from being written to so that a hardware component can read the data values stored therein. Unfortunately, restrictions such as interrupts waste valuable CPU time. As indicated above, set top boxes are capable of performing many functions. To waste CPU time waiting for an interrupt would only detract from the effectiveness of the other functions. Another type of restriction requires the clock logic to sample a "status bit" to determine when the clock registers can be written to. Such sampling decreases the efficiency of the set top box.

In view of the foregoing, there exists a need for a method, system and synchronization circuit for providing hardware component access to a set of data values without restriction. To this extent, a need exists for hardware-based synchronization within a device such as a set top box so that data values can be communicated between a set of clock registers operating at one frequency and a set of DCR registers operating at another frequency. Still yet, a need exists for a hardware component such as a CPU to be able to access data values in the set of clock registers by accessing the set of DCR registers.

SUMMARY OF THE INVENTION

In general, the present invention provides a method, system and synchronization circuit for providing hardware component access to a set of data value without restriction. Specifically, the present invention provides hardware-based synchronization with a set top box (STB) so that data values can be communicated between a set of DCR registers operating at a first frequency and a set of clock registers operating a second frequency. Under the present invention, when the STB is initialized, a control signal is activated so that initial data values can be written to the set of DCR registers. Once written, the control signal will be stretched and synchronized with a clock signal having the second frequency by a synchronization circuit (hardware). Thereafter, the initial data values are communicated (e.g., written) from the set of DCR registers to the clock registers. As time elapses, the initial data values are updated in the set clock registers by real time clock circuitry within the STB. As updates occur, the current set of data values can be displayed on a display (e.g., a LED display in the STB) and communicated (e.g., written) to the set of DCR registers. In particular, the synchronization circuit will synchronize the control signal with a clock signal have the first frequency so that the current set of data values can be communicated to the set of DCR registers. A hardware component (e.g., a CPU) can then read the current set of data values by accessing the set of DCR registers. Thus, the hardware component can access the current set of data values without direct access to the clock registers or a restriction (e.g., an interrupt, sampling, etc.).

According to a first aspect of the present invention, a method for accessing a set of data values in a set of registers using hardware-based synchronization is provided. The method comprises: (1) providing a control signal to write an initial set of data values to a first set of registers, wherein the first set of registers operates at a first frequency; (2) processing the control signal with a synchronization circuit to communicate the initial set of data values to a second set of registers, wherein the second set of registers operates at a second frequency; and (3) processing the control signal with the synchronization circuit to communicate a current set of data values from the second set of registers to the first set of registers.

According to a second aspect of the present invention, a system for providing hardware component access to a set of data values in a set of registers is provided. The system comprises: (1) a first set of registers operating at a first frequency; (2) a second set of registers operating at a second frequency; and (3) a synchronization circuit for processing a control signal to communicate sets of data values between the first set of registers and the second set of registers, wherein the synchronization circuit stretches the control signal, synchronizes the control signal with a clock signal having the second frequency, and synchronizes the control signal with a clock signal having the first frequency.

According to a third aspect of the present invention, a synchronization circuit for processing a control signal to provide hardware component access to a set of data values in a set of registers is provided. The synchronization circuit comprises: (1) a first set of logic operating at a first frequency that stretches the control signal; (2) a second set of logic operating at a second frequency that synchronizes the control signal with a clock signal having the second frequency so that an initial set of data values can be communicated from a first set of registers operating at the first frequency to a second set of registers operating at the second frequency; and (3) a third set of logic operating at the first frequency that synchronizes the control signal with a clock signal having the first frequency so that a current set of data values can be communicated from the second set of registers to the first set of registers, wherein the current set of data values is accessible in the first set of registers by a hardware component.

Therefore, the present invention provides a method, system and synchronization circuit for providing hardware component access to a set of data values without restriction.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and synchronization circuit for providing hardware component access to a set of data values without restriction. Specifically, the present invention provides hardware-based synchronization in a device such as a set top box (STB) so that data values can be communicated between a set of DCR registers operating at a first frequency and a set of clock registers operating a second frequency. Under the present invention, when the STB is initialized, a control signal is activated so that initial data values can be written to the set of DCR registers. Once written, the control signal will be stretched and synchronized with a clock signal having the second frequency by a synchronization circuit (hardware). Thereafter, the initial data values are communicated (e.g., written) from the set of DCR registers to the clock registers. As time elapses, the initial data values are updated in the set of clock registers by real time clock circuitry within the STB. As updates occur, the current set of data values can be displayed on a display (e.g., a LED display in the STB) and communicated (e.g., written) to the set of DCR registers. In particular, the synchronization circuit will synchronize the control signal with a clock signal have the first frequency so that the current set of data values can be communicated to the set of DCR registers. A hardware component (e.g., a CPU) can then read the current set of data values by accessing the set of DCR registers. Thus, the hardware component can access the current set of data values without direct access to the clock registers or a restriction (e.g., an interrupt, sampling, etc.).

Figure 1:
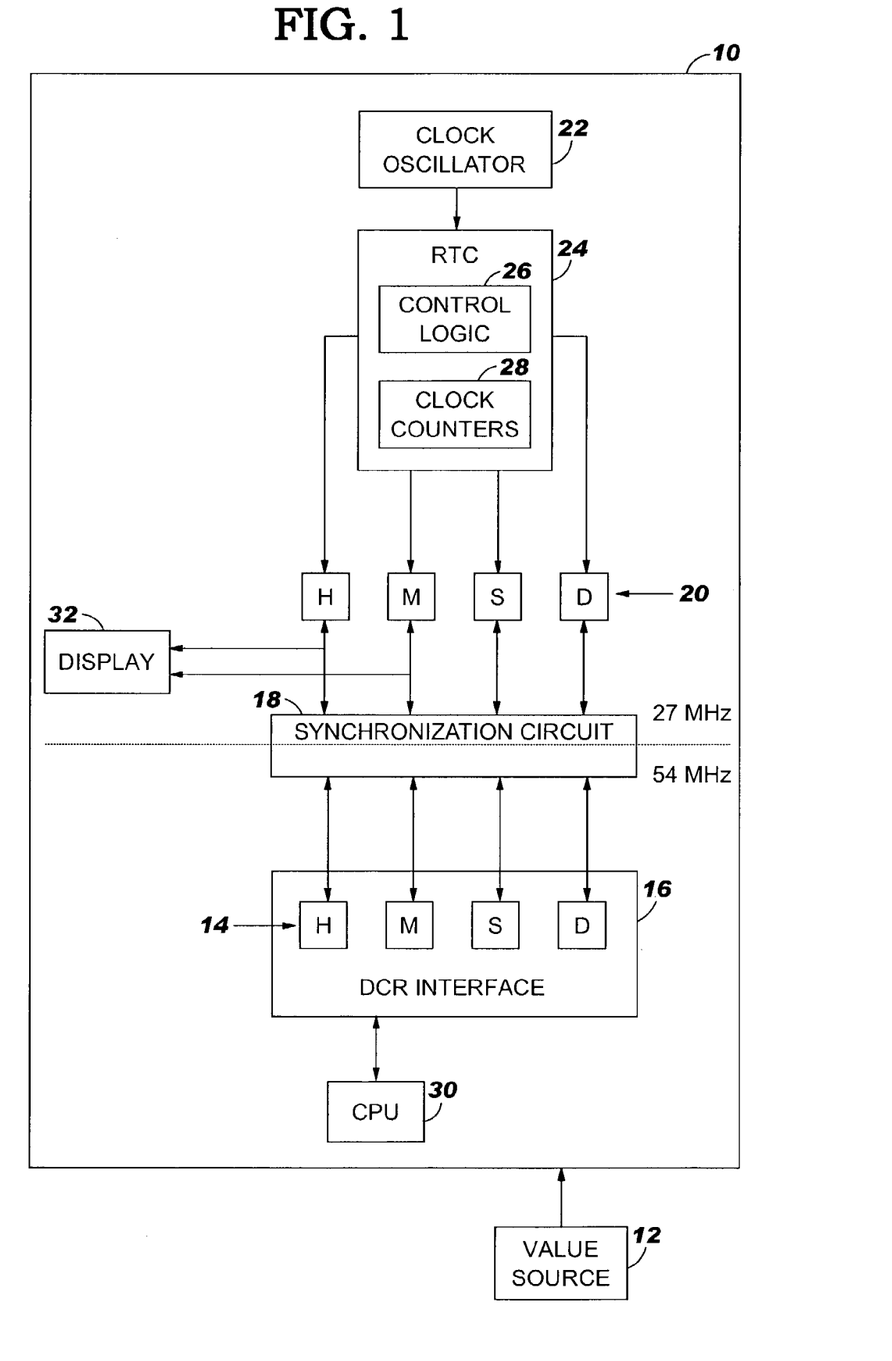
FIG. 1 depicts a set top box having a synchronization circuit for communicating data values between a set of DCR registers operating at one frequency and a set of clock registers operating at another frequency, according to the present invention.

Referring now to FIG. 1, an STB 10 according to the present invention is shown. As depicted, STB 10 includes: (1) DCR interface 16 having a set of DCR registers 14; (2) synchronization circuit 18 (hardware); (3) set of clock registers 20; (4) real time clock (RTC) logic 24 that includes control logic 26 and clock counters 28; (5) display hardware 32; (6) clock oscillator 22; and (7) CPU 30. It should be appreciated that the components shown within STB 10, as well as the architecture thereof, are shown to illustrate the teachings of the present invention only. To this extent, it should be understood that STB 10 can have additional elements and/or a different architecture than are shown in FIG. 1.

As further shown, STB 10 operates in two different frequency "domains." For example, DCR interface 16 and CPU 30 operates at 54 MHz, while set of clock registers 20, RTC logic 24, clock oscillator 22 and display hardware 32 operate at 27 MHz. It should be understood that the frequencies of 54 MHz and 27 MHz are intended to be illustrative only, and that STB 10 can be implemented with many different frequencies. Set of DCR registers 14 and set of clock registers 20 typically store data values pertaining to time and date. For example, the "H" registers store the hour, the "M" registers store the minute, the "S" registers store the seconds and the "D" register store the day or date. Such information is not only used for display to a user via display hardware 32, but it is also used by CPU 30 for performing various functions. It should be understood that separate registers are depicted for hours, minutes, seconds and date for illustrative purposes only. For example, set of DCR registers 14 and set of clock registers 20 could each include only one register that provides "collective" storage for hours, minutes, seconds and date. To this extent, the term "set" as used herein is intended to refer to one or more elements (e.g., registers, data values, etc.) In addition, it should be understood that is it is not necessary for storage to be provided for hours, minutes, seconds and date. For example, storage could be provided only for hours, minutes and seconds.

In a typical embodiment, an initial set of data values (e.g., time and date) are written to set of DCR registers 14 upon initialization or powering up of STB 10. In general, the initial set of data values is provided from an outside value source 12. For example, the initial set of data values can be provided via a satellite, a keyboard, etc. In any event, once the initial set of data values is available, a control signal (e.g., a "write" signal) will be provided/activated, which will cause the initial data values to be written to set of DCR registers 14. After being written, the control signal can be processed by synchronization circuit 18 so that the initial set of data values can be communicated (i.e., written) to set of clock registers 20. Processing of the control signal is necessary because the initial set of data values must be communicated across frequency boundaries. To this extent, synchronization circuit 18 is adapted to operate in both frequency domains (as illustrated by the dotted line).

As will be further described below, synchronization circuit 18 comprises hardware that includes three sets of logic that process the control signal so that data values can be communicated between set of DCR registers 14 and set of clock registers 20. Specifically, when the initial set of data values is to be communicated to set of clock registers 20, a first set of logic will stretch the clock signal. Once stretched, a second set of logic will synchronize the control signal with a clock signal having the frequency of the set of clock registers 20 (e.g., 27 MHz as shown in FIG. 1). After being synchronized in this manner, the initial set of data values will be communicated from set of DCR registers 14 to the corresponding set of clock registers 20.

Once the initial set of data values is written to set of clock registers 20, they can be updated by RTC logic 24 every second. In the illustrative embodiment shown in FIG. 1, RTC logic 24 operates at 27 MHz. This means that for every 27 million "tics" of clock oscillator 22, one second is elapsing. Thus, the initial set of data values in set of clock registers 20 are updated with a current set of data values every 27 million "tics" of clock oscillator 22. As further shown, the data values for hours and minutes stored in set of clock registers 20 (i.e., initial or current) are communicated to display hardware 32. This indicates that the hour and minutes are displayed on STB 10 for a user. It should be understood, however, although not shown, seconds and date could also be displayed.

As indicated above, it is advantageous to provide CPU 30 with access to the current set of data values. In previous designs, CPU 30 accessed set of clock registers 20 directly. However, since set of clock registers cannot be accessed while being written to by RTC logic 24, direct access by CPU 30 generally required a restriction such as an interrupt or the like. Unfortunately, waiting for an interrupt wastes valuable CPU time. Under the present invention, the current set of data values is communicated (e.g., written) to set of DCR registers 14, which CPU 30 will access via DCR interface 16. In communicating the current set of data values in this manner, however, the frequency boundary must be crossed again. Thus, further processing of the control signal is required. To this extent, synchronization circuit 18 will synchronize the control signal with a clock signal having the frequency in which set of DCR registers 14 operates (e.g., 54 MHz). Once synchronized with that clock signal, the current set of data values will be communicated to set of DCR registers 14. Once written to set of DCR registers 14, CPU 30 can read the current set of data values without restriction. That is, CPU 30 need not wait for an interrupt. It should be understood that CPU 30 is only one example of a hardware component that can be given access set of DCR registers 14. As such, it should be appreciated that other hardware components could read the current set of data values in the same manner as CPU 30.

As can be seen, by processing the control signal with synchronization circuit 18 as described, not only can data values be communicated between two sets of registers operating at different frequencies, but a hardware component such as CPU 30 can read the current set of data values without restriction or directly accessing set of clock registers 20. Such hardware-based synchronization avoids the restrictions (e.g., interrupts, sampling, etc.) that are traditionally necessary under software-based synchronization.

Figure 2A:
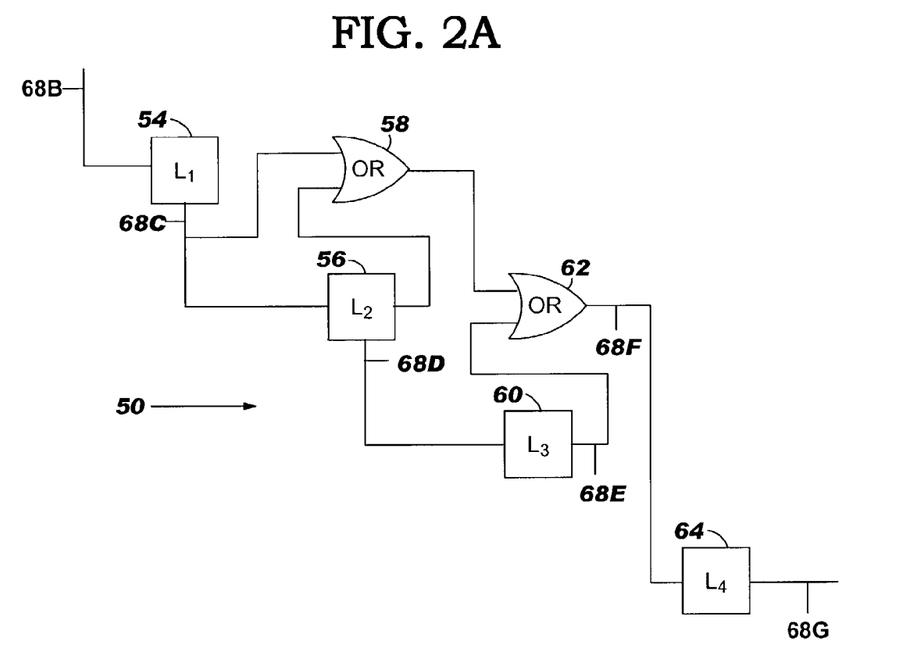
FIG. 2A depicts a first set of logic of the synchronization circuit of FIG. 1.
Figure 2B:
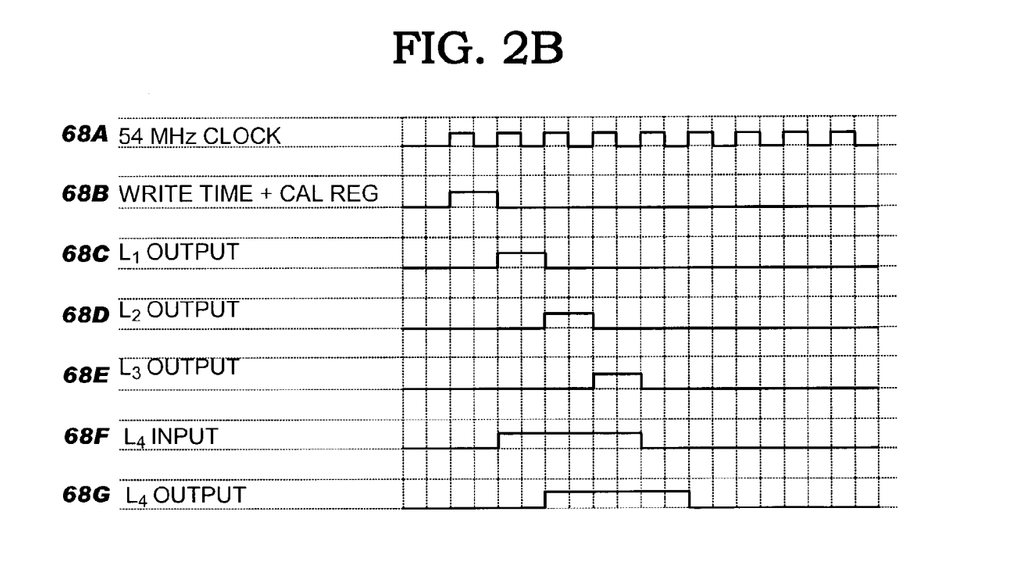
FIG. 2B depicts a set of timing diagrams corresponding to the first set of logic of FIG. 2A.

FIGS. 2A–B, 3A–B and 4A–B depict the three sets of logic and corresponding timing diagrams of synchronization circuit 18. Turning first to FIGS. 2A–B, first set of logic 50 will be described. As indicated above, first set of logic 50 operates in the frequency domain of set of DCR registers 14, as illustrated by 54 MHz clock signal 68A. When STB 10 is initialized, latch 54 will receive control signal 68B and output signal 68C to latch 56 and OR gate 58. Latch 56 will then output signal 68D to both latch 60 and OR gate 58. Upon receiving signals 68C and 68D, OR gate 58 will output a signal that is received by OR gate 62 along with signal 68E from latch 60. OR gate 62 will then output signal 68F to latch 64, which will output stretched control signal 68G.

Figure 3A:
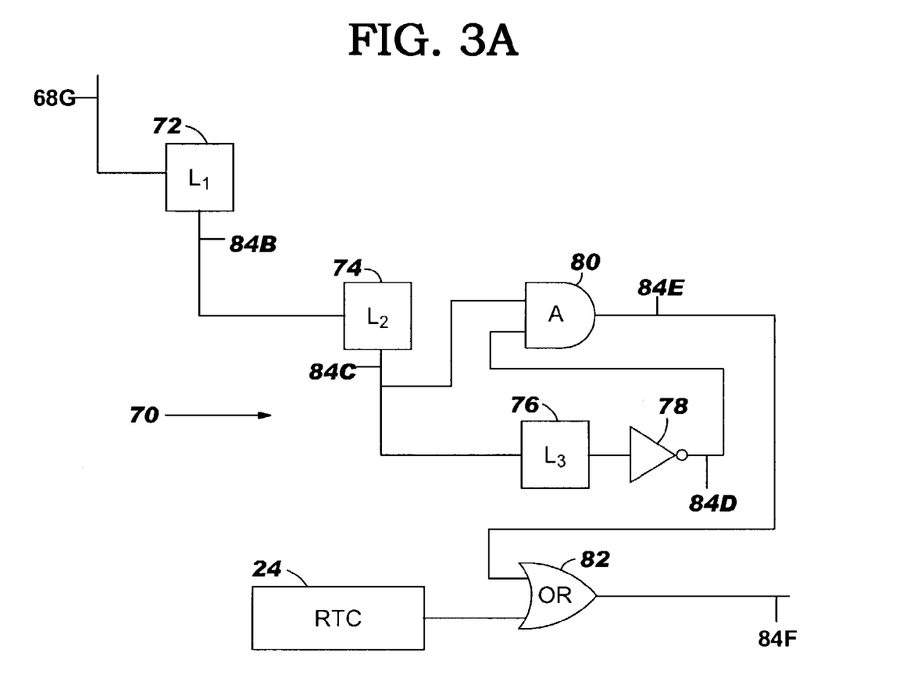
FIG. 3A depicts a second set of logic of the synchronization circuit of FIG. 1.
Figure 3B:
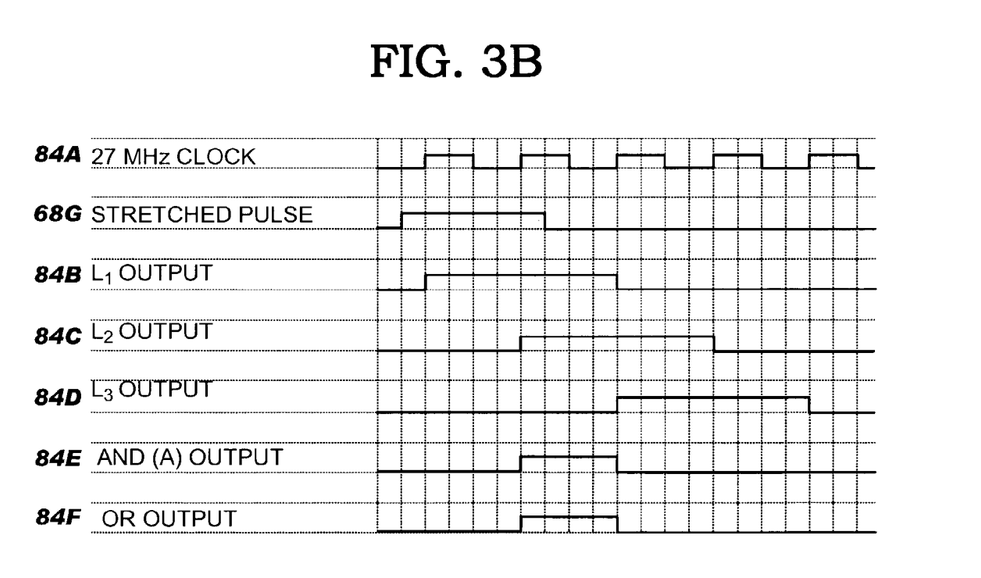
FIG. 3B depicts a set of timing diagrams corresponding to the second set of logic of FIG. 3A.

Once the control signal is stretched, it will be synchronized with a clock signal having the frequency of the set of clock registers 20 (e.g., 27 MHz) by a second set of logic within synchronization circuit 18. Referring now to FIGS. 3A–B, second set of logic 70 is shown in greater detail. Second set of logic 70 operates in the frequency domain of set of clock registers 20 (e.g., 27 MHz). As can be seen, 27 MHz clock signal 84A has twice the pulse width of 54 MHz clock. Latch 72 will receive the stretched control signal 68G from first set of logic 50 and output signal 84B to latch 74. Upon receiving signal 84B, latch 74 will output signal 84C to AND gate 80 and latch 76. Inverter 78 will invert the output of latch 76 to provide signal 84D, which is received by AND gate 80. Upon receiving signals 84C and 84D, AND gate 80 will output signal 84E to OR gate 82, which might also receive signals from RTC logic 24. Specifically, it could be the case that a data value is being written to set of clock registers 20 via synchronization circuit 18 at the same time a data value is received from RTC logic 24. In a typical embodiment, OR gate 82 is programmed to "defer" to the value being written via synchronization circuit 18 (i.e., signal 84E received from AND gate 80). In any event, OR gate 82 will output signal 84F that is synchronized with clock signal 84A. Specifically, as can be seen, a second (left) edge of the pulse in signal 84F is aligned with a second (left) edge of a pulse in clock signal 84A.

Once the control signal is stretched and synchronized with clock signal 84A, the initial set of data values can be communicated from set of DCR registers 14 to set of clock registers 20. As time elapses, set of clock registers 20 are updated with a current set of data values that are communicated from set of clock registers 20 to set of DCR registers 14. Because the current set of data values must be communicated across the frequency boundary, the third set of logic within synchronization circuit 18 must synchronize the control signal with clock signal 68A.

Figure 4A:
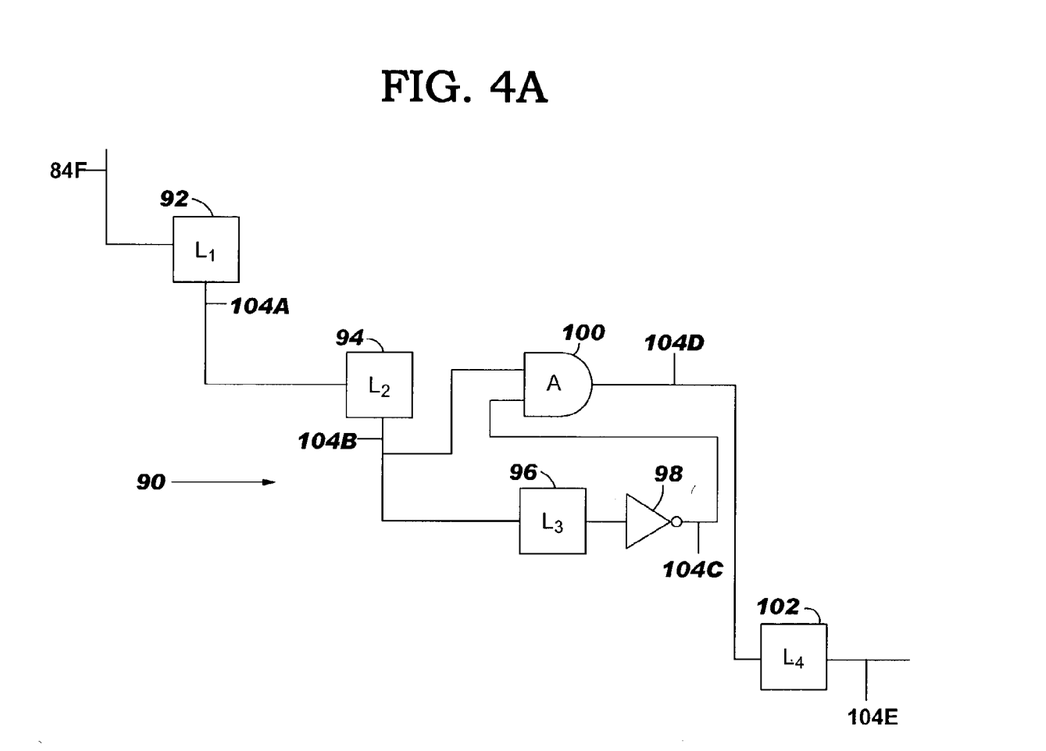
FIG. 4A depicts a third set of logic of the synchronization circuit of FIG. 1.
Figure 4B:
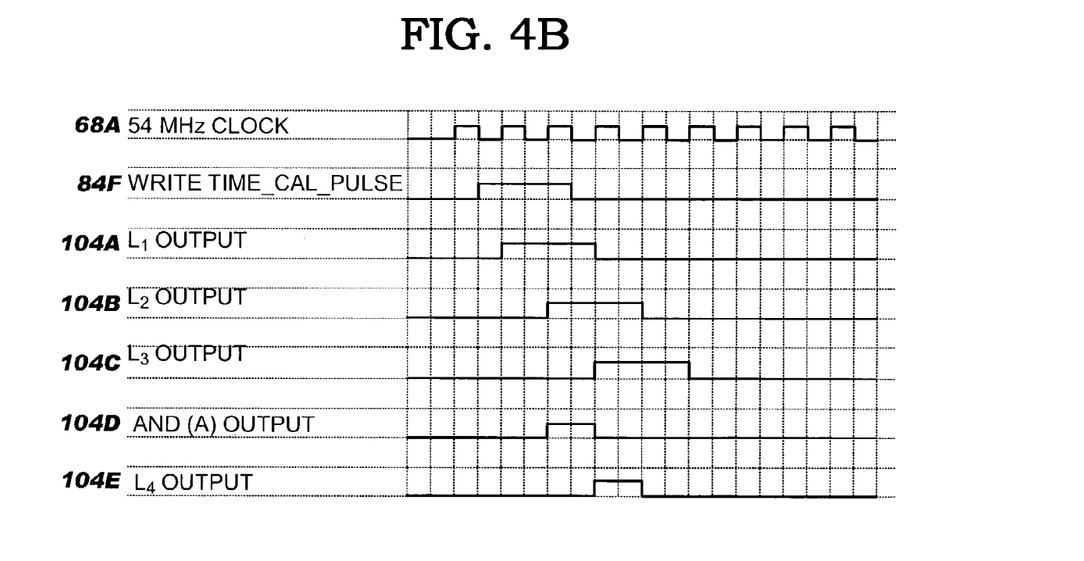
FIG. 4B depicts a set of timing diagrams corresponding to the third set of logic of FIG. 4A.

Referring to FIGS. 4A–B, third set of logic 90 is shown. As depicted, latch 92 will receive control signal 84F, which was synchronized with 27 MHz clock signal 84A (FIG. 3B), and output signal 104A to latch 94. Upon receiving signal 104A, latch 94 will output signal 104B to latch 96 as well as AND gate 100. Latch 96 will receive signal 104B and output a signal to inverter 98, which will output signal 104C to AND gate 100. Upon receiving signals 104B and 104C, AND gate 100 will output signal 104D to latch 102. Latch 102 will output signal 104E, which is synchronized with 54 MHz clock signal 68A (i.e., the "second" or "left" edges of the pulses are aligned). Once the control signal is synchronized with clock signal 68A, the current set of data values can be communicated from set of clock registers 20 to set of DCR registers 14 where they can be accessed (i.e., read) by CPU 30 or some other hardware component.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, it should be understood that more than one control signal can be provided and processed by synchronization circuit 18 in communicating data values between set of DCR registers 14 and set of clock register 20. For example, a first control signal could be processed to communicate the initial set of data values to set of clock registers 20, while a second control signal could be processed to communicate the current set of data values to set of DCR registers 14. Moreover, although the current set of data values are typically different than the initial set of data values, this need not be case. For example, the sets of data values could be identical if the STB is experiencing a hang condition.

We claim:

1. A method for accessing a set data values in a set of registers using hardware-based synchronization, comprising:
   providing a control signal comprising a clock signal having an initial set of data values to write the initial set of data values to a first set of registers, wherein the first set of registers operates at a first frequency;
   processing the control signal with a synchronization circuit to communicate the initial set of data values to a second set of registers, wherein the second set of registers operates at a second frequency; and
   processing the control signal with the synchronization circuit to communicate a current set of data values from the second set of registers to the first set of registers, wherein the first set of registers is adapted to provide the current set of data values to a hardware component without a an interrupt.

2. The method of claim 1, further comprising accessing the current set of data values from the first set of registers with the hardware component.

3. The method of claim 1, wherein the step of processing the control signal with the synchronization circuit to communicate the initial set of data values to the second set of registers comprises:
   stretching the control signal; and
   synchronizing the control signal with a clock signal having the second frequency.

4. The method of claim 3, wherein the step of processing tile control signal with the synchronization circuit to communicate the current set of data values from the second set of registers to the first set of registers comprises synchronizing the control signal with a clock signal having the first frequency.

5. The method of claim 1, wherein the first frequency is different than the second frequency.

6. The method of claim 1, wherein the initial set of data values is different than the current set of data values.

7. The method of claim 1, wherein the initial set of data values is identical to the current set of data values.

8. The method of claim 1, further comprising outputting the current set of data values from the second set of registers to a display.

9. The method of claim 1, wherein the first set of registers is a set of device control registers, and wherein the second set of registers is a set of clock registers.

10. A system for providing hardware component access to a set data values in a set of registers, comprising:
    a first set of registers operating at a first frequency;
    a second set of registers operating at a second frequency; and
    a synchronization circuit for processing a control signal to communicate sets of data values between the first set of registers and the second set of registers, wherein the synchronization circuit stretches the control signal, synchronizes the control signal with a clock signal having the second frequency, and synchronizes the control signal with a clock signal having the first frequency,
    wherein the first set of registers is adapted to provide a current set of data values to a hardware component without a an interrupt.

11. The system of claim 10, further comprising the hardware component for accessing the current set of values in the first set of registers.

12. The system of claim 11, wherein the hardware component is a central processing unit.

13. The system of claim 10, wherein the first frequency is different than the second frequency.

14. The system of claim 10, wherein the synchronization circuit includes:
    a first set of logic operating at the first frequency that stretches the control signal;
    a second set of logic operating at the second frequency that synchronizes the control signal with the clock signal having the second frequency so that an initial set of data values can be communicated from the first set of registers to the second set of registers; and
    a third set of logic operating at the first frequency that synchronizes the control signal with the clock signal having the first frequency so that a current set of data values can be communicated from the second set of registers to the first set of registers.

15. A synchronization circuit for processing a control signal to provide hardware component access to a set of data values in a set of registers, comprising:
    a first set of logic operating at a first frequency that stretches the control signal;
    a second set of logic operating at a second frequency that synchronizes the control signal with a clock signal having the second frequency so that an initial set of data values can be communicated from a first set of registers operating at the first frequency to a second set of registers operating at the second frequency; and
    a third set of logic operating at the first frequency that synchronizes the control signal with a clock signal having the first frequency so that a current set of data values can be communicated from the second set of registers to the first set of registers, wherein the current set of values is accessible in the first set of registers by a hardware component without an interrupt.

16. The synchronization circuit of claim 15, wherein the first set of logic includes:
    a first latch for receiving the control signal;
    a second latch for receiving an output of the first latch;
    a first OR gate for receiving the output of the first latch and an output of the second latch;
    a third latch for receiving the output of the second latch;
    a second OR gate for receiving an output of the first OR gate and an output of the third latch; and
    a fourth latch for receiving an output of the second OR gate.

17. The synchronization circuit of claim 15, wherein the second set of logic includes:
    a first latch for receiving a stretched control signal from the first set of logic;
    a second latch for receiving an output of the first latch;
    a third latch for receiving an output of the second latch;
    an inverter for inverting an output of the third latch;
    an AND gate for receiving an output of the second latch and an output of the inverter; and
    an OR gate for receiving an output of the AND gate and an output of a clock.

18. The synchronization circuit of claim 15, wherein the third set of logic includes:

a first latch for receiving the control signal synchronized with the second frequency;
a second latch for receiving an output of the first latch;
a third latch for receiving an output of the second latch;
an inverter for inverting an output of the third latch;
an AND gate for receiving an output of the second latch and an output of the inverter; and
a fourth latch for receiving an output of the AND gate.

19. The synchronization circuit of claim 15, wherein the first frequency is different than the second frequency.

20. The synchronization circuit of claim 15, wherein the hardware component is a central processing unit.

* * * * *

UNITED STATES PATENT AND TRADEMARK OFFICE
CERTIFICATE OF CORRECTION

PATENT NO. : 7,017,066 B2  
APPLICATION NO. : 10/411864  
DATED : March 21, 2006  
INVENTOR(S) : Retter et al.

It is certified that error appears in the above-identified patent and that said Letters Patent is hereby corrected as shown below:

Column 7,
Line 37, remove "tile" and insert -- the --.

Signed and Sealed this

Twentieth Day of June, 2006

JON W. DUDAS
*Director of the United States Patent and Trademark Office*